United States Patent [19]

Mesnel

[11] Patent Number: 4,926,600
[45] Date of Patent: May 22, 1990

[54] SECTION FORMING A GRIPPER FOR AUTOMOBILE GASKETS

[75] Inventor: Gerard Mesnel, Carrieres sur Seine, France

[73] Assignee: Etablissements Mesnel S.A., Carrieres-sur-Seine, France

[21] Appl. No.: 288,230

[22] Filed: Dec. 22, 1988

[30] Foreign Application Priority Data

Dec. 23, 1987 [FR] France .................................. 87 18032
Aug. 1, 1988 [FR] France .................................. 88 10376

[51] Int. Cl.$^5$ .............................................. E06B 7/16
[52] U.S. Cl. ........................................ 49/491; 49/496; 52/716; 428/122
[58] Field of Search ................. 49/491, 490, 496, 497, 49/440, 441; 52/716; 428/122

[56] References Cited

U.S. PATENT DOCUMENTS

| 3,124,851 | 3/1964 | Straight et al. | 49/491 |
| 3,239,987 | 3/1966 | Lansing | 49/490 X |
| 4,123,100 | 10/1978 | Ellis | 49/490 X |
| 4,214,036 | 7/1980 | Bright | 49/491 X |
| 4,328,273 | 5/1982 | Yackiw | 49/496 X |
| 4,472,469 | 9/1984 | Thies | 49/490 X |

Primary Examiner—Philip C. Kannan
Attorney, Agent, or Firm—Foley & Lardner, Schwartz, Jeffery, Schwaab, Mack, Blumenthal & Evans

[57] ABSTRACT

The invention relates to a section forming a gripper for an automobile gasket, this section being required to cap a projecting element (2) of the body and comprising a longitudinal metal core (4) of U-shaped cross-section, sheathed in a plastic (5) which, on the faces of the U opposite one another, has projecting parts (9, 10) intended for coming into contact with the lateral faces of the said projecting element (2) of the body.

According to the invention, on at least one of the said faces of the U a projecting part is formed by a tubular element (10), inside which is seated at least one longitudinal reinforcing member (11) capable of exerting a constant counterpressure on the inner face of the wall of the said tubular element (10) required to come in contact, by means of its outer face, with the said projecting element (2) of the body.

14 Claims, 3 Drawing Sheets

SECTION FORMING A GRIPPER FOR AUTOMOBILE GASKETS

The present invention relates to a new section forming a gripper for automobile gaskets.

It is known that these gaskets conventionally comprise, on the one hand, a section forming a gripper, capable of capping a projecting part or a rebate of the body, and, on the other hand, an actual sealing element comprising, for example, a sealing lip and/or a tubular part intended to be gripped between a doorframe and the associated door.

The profile forming a gripper usually comprises a longitudinal metal core of U-shaped cross-section, sheathed in a plastic, such as plasticized polyvinyl chloride, which has been extruded onto the metal core. On the faces of the branches of the U-shape arranged opposite one another, the plastic has projecting parts, such as lips inclined towards the base of the U, which retract when the part forming a gripper is placed onto the projecting edge of the associated rebate of the body, and which prevent this part forming a gripper from being disconnected accidentally.

However, these sections are subjected to very high stresses (the counterpressure exerted by the rebate to which they are fastened) and are also exposed continuously to the weather and/or to the sun. Now it is well known that the metal of an automobile body stationary for many hours in strong mid-summer sunlight can reach a very high temperature. Under such thermal conditions, the plastic can become at least partially thermoplastic, and permanent deformations of the section forming a gripper can occur in the region of the rebate which it caps, as a result of which this section and the associated rebate are disconnected from one another and there is a risk that the gasket will tilt.

To overcome this serious disadvantage, although there has been a proposal to use improved polyvinyl chloride compositions, nevertheless, apart from the fact that such compositions are much more costly than conventional PVC, there has not yet been any development of plastic compositions having the requisite qualities for this type of use and being capable of withstanding the thermal conditions often encountered on automobiles exposed to sunlight in mid-summer.

The object of the present invention is to avoid these disadvantages by substituting for the lips provided on at least one of the branches of the U of the section forming a gripper a tubular part which is itself required to come laterally into contact with the rebate of the body capped with the said gripper, and by inserting into this tubular part a reinforcing element capable of exerting a constant counter pressure on that wall of the tubular part in contact with the said rebate.

The subject of the invention is, therefore, a section forming a gripper for an automobile gasket, this section being required to cap a projecting element of the body and comprising a longitudinal metal core of U-shaped cross-section, sheathed with a plastic which, on the faces of the U opposite one another, has projecting parts intended for coming in contact with the lateral faces of the projecting element of the body, the said section being defined in that, on at least one of the said faces of the U, a projecting part is formed by a tubular element, inside which is seated at least one longitudinal reinforcing member capable of exerting a constant counterpressure on the inner face of that wall of the said tubular element required to come into contact, by means of its outer face, with the said projecting element of the body.

The gaskets comprising such a section forming a gripper are another subject of the invention.

As a result of the counterpressure exerted by the reinforcing member, the plastic of the section will not experience any permanent deformation upon contact with the projecting part of the body, even when the latter, following prolonged exposure to sunlight, reaches a very high temperature, and there would no longer be any risk that the gasket comprising such a section will be disconnected from the support of the gripper.

The inner reinforcement of the tubular element of the section can be produced in various forms and from various materials which an average person skilled in the art can select in accordance with the desired effects.

In a first embodiment of the invention, this inner reinforcement can, for example, be composed of a cylindrical and preferably tubular element of any cross-section, made of a material having a high resistance to permanent deformation under heat, for example an elastomer, such as rubber or a silicon. Advantageously, the reinforcing element will be produced in the form of an extruded tube made of an elastomer incorporating a vulcanizing additive, so that, during extrusion, this elastomer is simultaneously vulcanized. This reinforcing element can be produced separately, and the section together with its tubular part will subsequently be extruded simultaneously onto the metal core and round the reinforcing element.

In a second embodiment having increased resistance to permanent deformation, the reinforcing member will be composed of a cross-linked or thermoplastic expanded elastomeric material which has good properties of resilience and of resistance to permanent deformation at the normal operating temperatures and which fills the said tubular element and has been expanded within this.

Of the expanded elastomeric materials which can be used in this embodiment, mention will be made, without this list being limiting, of block polymers capable of cross-linking in the presence of a few ppm of moisture, such as, for example, the product marketed by Messrs. NORTON under the designation of THERMOFOAM, or a plastomer/elastomer alloy extrudable with an inert gas dissolved under pressure to obtain the cellular state, and this alloy can be, for example, TREFSIN which is a product marketed by Messrs EXXON.

A polyurethane foam expanded in situ by means of a process known per se can also be used.

The accompanying drawings illustrate by way of non-limiting example embodiments of a section for a gasket according to the invention. In these drawings.

Figure 1:
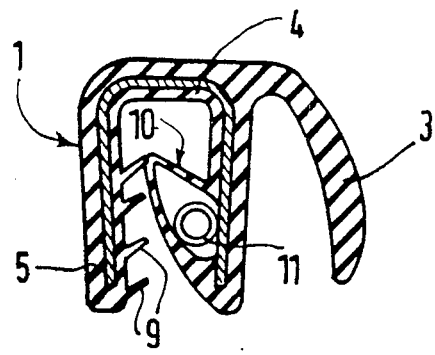
FIG. 1 is a cross-section through a first embodiment of a section according to the invention.
Figure 2:
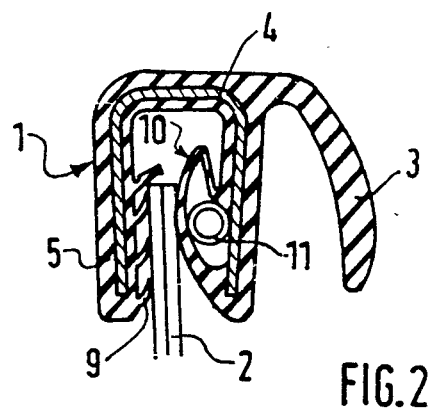
FIG. 2 is a similar view of the section of FIG. 1, when it is engaged in the position of use on a rebate of an automobile body.
Figure 3:
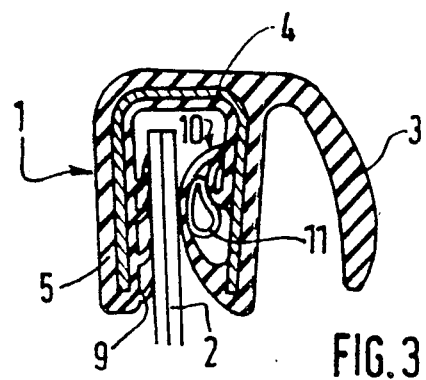
FIG. 3 is a view similar to that of FIG. 2, illustrating the deformation of the reinforcement of the tubular part of the section, when it is subjected to a higher stress at the end of the engagement of the section onto the supporting rebate.

The section illustrated in FIGS. 1 to 3 comprises, on the one hand, a gripper 1 intended for capping a projecting edge 2 of an automobile body in the region of the frame of a door and, on the other hand, a sealing lip 3 adjoining the gripper 1. The latter comprises, in a known way, a metal core 4 made, for example, of aluminum or steel and of U-shaped cross-section, sheathed in a layer 5 of an extruded plastic, such as plasticized polyvinyl chloride, integral with the lip 3. A sealing element (not shown) can be bonded adhesively against the layer 5 of plastic of the part forming a gripper 1 and to the lip 3, in order to form with the latter a sealing lip. The sealing element can be of any type known per se and be limited, for example, to the sealing lip adhering to the lip 3 or comprise an elastically deformable tubular part intended, for example, to be gripped between a doorframe and the associated door.

In a known way, along the inner face of one of the branches of the U of the part forming a gripper, the plastic layer 5 has protuberances forming small lips 9 inclined towards the base of the U and intended for anchoring the gripper 1 on the projecting edge 2 of the body, to prevent it from being disconnected accidentally from this part 2. Conventionally, the other branch of the U likewise possesses at least one lip of larger dimensions.

As explained above, the plastic 5 is subjected to the reaction stresses of the part 2 which can reach high temperatures after long exposure to sunlight in hot weather. Under such conditions, the plastic 5 can become at least partially thermoplastic and thus undergo permanent deformation, as a result of which there is a serious risk that the gripper 1 will acquire some play relative to the part 2 and that the gasket will tilt relative to its support.

To overcome this disadvantage, according to the invention, on the inner face of the branch of the U arranged opposite the lips 9 the plastic layer 5 is shaped according to a tubular profile 10 in the form of a beak, which is directed towards the base of the U and in the recess of which is seated a reinforcing member. In this particular case, this reinforcing member is composed of a small tube 11 made of vulcanized rubber, the diameter of which is such that, when the gripper 1 is in position on the part 2, it exerts a counterpressure against the inner face of the wall of the beak 10 subjected to stress by this part 2. Even if this wall reaches too high a temperature or experiences such forces that it risks becoming deformed, it will continue to be stressed by the reinforcement 11 and will thus preserve its original form, thereby maintaining a constant counter-pressure against the lips 9 which themselves will preserve their initial form.

As can be seen in the drawings, the reinforcement 11 can be deformed to a greater or lesser extent according to the stresses to which it is subjected, when it is put in a position of use on the rebate 2. In this position, the reinforcement 11 can bear against the plastic sheathing the core 4 or even, where appropriate, directly against this core.

It will be seen that it is possible to extrude the plastic sheathing the core 4 round the latter and the reinforcement 11 simultaneously, so that the section according to the invention can be produced as simply as conventional sections by using the known means of the art.

Of course, a tubular element 10 equipped with at least one reinforcing element 11 can be provided on the two inner faces of the branches of the U, thus ensuring that the section is actually locked in position on the rebate serving as a support for it, and at the same time eliminating any risk that this section will tilt.

Figure 4:
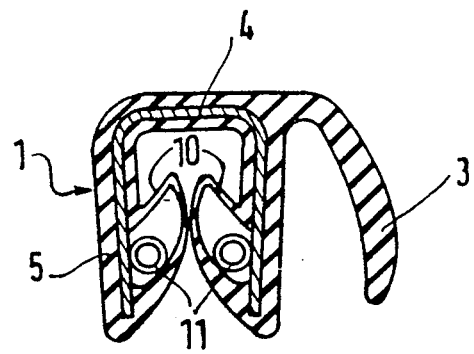
FIG. 4 is a cross-section through an alternative version of this embodiment of a section according to the invention.
Figure 5:
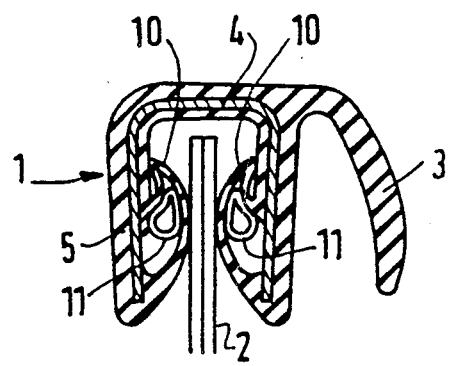
FIG. 5 illustrates this alternative version in the position of use on a rebate of an automobile body.

This alternative version of the section according to the invention is illustrated in FIGS. 4 and 5 of the drawings, in which the members already described with reference to FIGS. 1 to 3 are designated by the same reference numerals.

In this alternative version, the small lips 9 have been omitted and are replaced by a second tubular element 10 equipped with a tubular reinforcement 11, the two tubular elements being arranged symmetrically opposite one another on the inner faces of the branches of the U of the core. Of course, one or more beaks arranged symmetrically or not can be provided, according to the demands made on the section and on its use on an automobile body.

Figure 6:
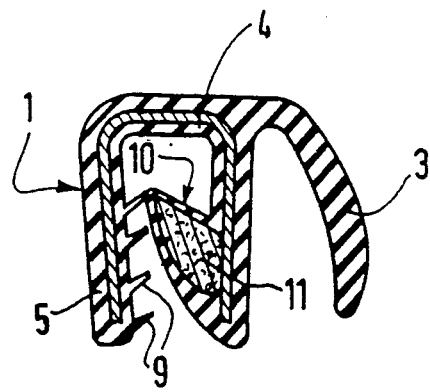
FIG. 6 is a cross-section through a third embodiment of a section according to the invention.
Figure 7:
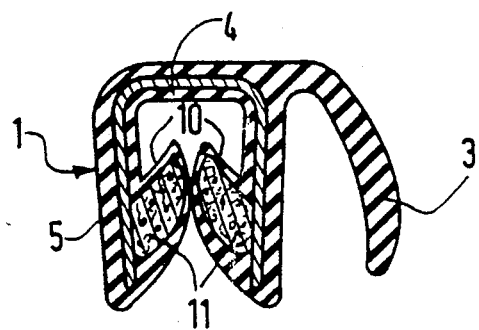
FIG. 7 is a cross-section through a fourth embodiment of a section according to the invention.

FIGS. 6 and 7 are to be compared respectively with FIGS. 1 and 4 above and are identical to them in all respects, with the exception of the reinforcing element. The identical members are designated there by the same reference numerals.

In this embodiment, the plastic layer 5 is shaped, on the inner surface of one of the branches of the U, according to a tubular profile 10 in the form of a beak, which is directed towards the base of the U and in the recess of which is seated a reinforcing member 11 composed of an elastomeric material expanded in situ inside the tube, and plastic or cross-linked, but possessing good properties of resistance to permanent deformation at the customary operating temperatures.

In the alternative version of FIG. 7, the small lips 9 have been omitted and are replaced by a second tubular element 10 symmetrical relative to the first and, like this, containing a reinforcing element 11 composed of an elastomeric material expanded in situ inside the tube. As before, this material has satisfactory properties of resistance to permanent deformation at the customary operating temperatures.

I claim:

1. An automobile gasket gripper for capping a projecting element of an automobile, comprising:
   a capping member having substantially parallel faces adapted to receive the projecting element;
   said capping member having projecting parts projecting from each face adapted to contact the projecting element;
   at least one projecting part being hollow and having a wall which contacts the projecting element with its outer face, the projecting part having disposed therein a means for exerting a substantially constant counterpressure on a portion of an inner face of the wall of the tubular element opposite the outer face;
   wherein the capping comprises a longitudinal metal core having a U-shaped cross-section and a sheath or plastic-like material surrounding the core; and
   wherein upon receiving the projecting element, the counterpressure means bears against a portion of the longitudinal metal core.

2. The gripper according to claim 1, wherein the counterpressure means is a longitudinal cylindrical element.

3. The gripper according to claim 1, wherein the counterpressure means is a longitudinal tubular element.

4. The gripper according to claim 1, wherein the counterpressure means is formed from an elastomer.

5. The gripper according to claim 1, wherein the counterpressure means is formed from silicone.

6. The gripper according to claim 1, wherein the counterpressure means comprises an extruded tube formed from an elastomer incorporating a vulcanizing additive.

7. The gripper according to claim 1, wherein the plastic-like sheath material is simultaneously extruded onto the metal core and around the counterpressure means.

8. The gripper according to claim 1, wherein the capping member has hollow projecting parts projecting from both faces, each said hollow projecting part having a wall which contacts the projecting element with its outer face and having disposed therein a means for exerting a substantially constant counter-pressure on a portion of an inner face of the wall of the projecting part opposite the outer face.

9. The gripper according to claim 1, wherein the counterpressure means comprises a cross-linked expanded elastomeric material which is resilient and has resistance to permanent deformation at normal operating temperatures, the elastomeric material substantially filling the hollow projecting part.

10. The gripper according to claim 9, wherein the cross-linked expanded elastomeric material is selected from a group consisting of polyurethane foams, polymers which cross-link upon contact with moisture, plastomer alloys extrudable with an inert gas dissolved under pressure during extrusion operations, and elastomer alloys extrudable with an inert gas dissolved under pressure during an extrusion operation.

11. The gripper according to claim 1, wherein the counterpressure means comprises thermoplastic expanded elastomeric material which is resilient and has resistance to permanent deformation at normal operating temperatures, the elastomeric material substantially filling the hollow projecting part.

12. The gripper according to claim 11, wherein the thermoplastic expanded elastomeric material is selected from a group consisting of polyurethane foams, polymers which cross-link upon contact with moisture, plastomer alloys extrudable with an inert gas dissolved under pressure during an extrusion operation, and elastomer alloys extrudable with an inert gas dissolved under pressure during an extrusion operation.

13. An automobile gasket, comprising:
a sealing element; and
a gripper for capping a projecting element of an automobile, said gripper comprising a longitudinal metal core having a U-shaped cross-section, the U-shaped core having substantially parallel faces adapted to receive the projecting element; and a sheath of plastic-like material surrounding the U-shaped metal core;
said sheath having projecting parts projecting from each face adapted to contact the projecting element;
at least one projecting part being hollow and having a wall which contacts the projecting element with its outer face, the projecting part having disposed therein a means for exerting a substantially constant counterpressure on a portion of an inner face of the wall of the projecting part opposite the outer face;
wherein upon receiving the projecting element, the counterpressure means bears against a portion of the U-shaped core.

14. An automobile gasket, comprising:
a sealing element; and
a gripper for capping a projecting element of an automobile, said gripper comprising a capping element having substantially parallel faces adapted to receive the projecting element;
said capping element having projecting parts projecting from each face adapted to contact the projecting element;
at least one projecting part being hollow and having a wall which contacts the projecting element with its outer face, the projecting part having disposed therein a means for exerting a substantially constant counterpressure on a portion of an inner face of the wall of the projecting part opposite the outer face;
wherein the capping element comprises a longitudinal metal core having a U-shaped cross-section and a sheath of plastic-like material surrounding the core; and
wherein upon receiving the projecting element, the counterpressure means bears against a portion of the longitudinal metal core.

* * * * *